Patented Sept. 28, 1948

2,450,317

UNITED STATES PATENT OFFICE 2,450,317

NICKEL-IMPREGNATED CLAY CATALYST AND PROCESS OF MAKING SAME

Alexis Voorhies, Jr., and William E. Spicer, Baton Rouge, La., assignors to Standard Oil Development Company, a corporation of Delaware No Drawing. Original application April 25, 1945, Serial No. 590,300. Divided and this application June 11, 1946, Serial No. 676,111

2 Claims. (Cl. 252—450)

This application is a division of our co-pending application, Serial No. 590,300 filed April 25, 1945.

The object of our invention is to improve the activity of catalysts suitable in the destructive hydrogenation of hydrocarbon oils.

In the destructive hydrogenation of hydrocarbon oils or, in fact, for example, in the saturation with hydrogen of hydrocarbon oils, in reforming and hydroforming and various other operations, an active catalyst supported on a suitable carrier or spacing agent is invariably utilized. The catalyst is prepared by impregnating the base or carrier, which in many cases is alumina or clay, with a water soluble salt of the active catalyst component, thereafter decomposing the salt in situ, and activating the catalyst by a prolonged heating. We have found that the manner in which the base is heat treated influences the activity of the catalyst. The heat treatment is particularly effective in the case of clays.

In preparing a typical catalyst of the character described, we proceed as follows:

Example I

We first HF-treat an acid washed bentonitic clay such as "Super Filtrol" (the base) as follows: At ordinary temperatures we treat 100 pounds of the clay with 100 pounds of 10% HF in a Simpson (edge runner) mixer. The HF-treated clay is then heated to dry the same, and thereafter is heated to a temperature of about 850° F. (in, say, a Herreshoff furnace) and maintained at this temperature for a period of about 6 hours. This is the step comprising activation of the base. The base is then cooled to room temperature and impregnated with nickel nitrate solution and heated to decompose the nickel nitrate to form nickel oxide. The oxide is then reduced by treatment with hydrogen at 800–900° F. It should be pointed out that during the manufacture of the catalyst it is preferable, in case a shaped body such as a pellet is to be formed, that the catalyst be extruded or otherwise molded following impregnation with the salt of nickel while it is still wet, and, therefore, the final drying and reduction of the nickel oxide is accomplished after the catalyst has been shaped. The amount of nickel present in the final catalyst in the present example is 7 weight per cent, and hence, the amount of nickel nitrate necessary to yield the stated amount of metallic nickel must be used to impregnate the base.

Example II

In preparing tungsten sulfide on bentonitic clay, we impregnate the HF-treated clay with a solution of tungstic oxide in ammonium sulfide, and thereafter heat the clay to decompose the tungstic salt to form a mixture of the oxide and the sulfide. In this example the clay is activated by heating as in Example I, i. e. before impregnation with tungstic oxide. Sufficient tungstic salt is employed to form a catalyst containing 10–11% tungsten sulfide on the carrier, the tungsten being converted more completely to the sulfide by treatment with sulfur compounds such as $H_2S, CS_2$ or organic sulfides such as those contained in petroleum oils.

Example III

In order to show the utility of our invention, we subjected a Quiriqurie oil having an A. P. I. gravity of 44.3 to a destructive hydrogenation at a temperature of 600° F. while maintaining a pressure of 3000 pounds per square inch (hydrogen pressure), and the catalyst of Example I was used with the results given below; it is to be noted that the base was treated during activation at various temperatures from 300–1200° F., and furthermore, the data show that temperatures of around 850° F. are optimum for the A. P. I. gravity of the oil (showing maximum catalyst activity) is highest using this type of heat treatment for the carrier.

| Run No. | IH-50 | IH-35 | IH-95 | IH-139 | IH-120 |
|---|---|---|---|---|---|
| Temperature of Heating for Base: | | | | | |
| Before HF-Treat, °F | 300 | 300 | 300 | 300 | 300 |
| After HF-Treat but Before Impregnating with Nickel | 300 | 600 | 850 | 1000 | 1200 |
| Product, ° A. P. I. Gravity | 66.5 | 65.6 | 74.8 | 71.9 | 67.0 |

It is to be understood that the specific details, which we have set forth hereinbefore, are illustrative and do not impose any limitations on my invention. We may use as a carrier any bentonitic clay or any acid-treated bentonitic clay, and as the active component we may use the heavy metals of the V, VI, and VIII groups of the periodic system, or their sulfides.

To recapitulate briefly, we have found that an improved step in the preparation of hydrogenation catalyst involves an optimum temperature range during which the carrier or spacing agent is heat treated for the purpose of activating the same. We have secured data which show that the carriers of the bentonitic clay type should be activated by heating at temperatures of from 600–1200° F., preferably from 850–1000° F.

Numerous modifications of our invention shall be readily apparent to those who are familiar with this art.

What we claim is:

1. The method of forming an active hydrogenation catalyst which consists essentially in subjecting a bentonitic clay to treatment with hydrofluoric acid, thereafter activating the clay by heating the same to a temperature within the range 850° to 1000° F. during a period of 4 to 8 hours, cooling and incorporating metallic nickel into the activated carrier by impregnation.

2. A hydrogenation catalyst consisting essentially of a hydrofluoric acid bentonitic clay activated by heating to a temperature within the range of from about 850° to 1000° F. for a period of four to eight hours followed by cooling and thereafter combined with metallic nickel by impregnation.

ALEXIS VOORHIES, Jr.
WILLIAM E. SPICER.

REFERENCES CITED

The following references are of record in the file of this patent:

UNITED STATES PATENTS

| Number | Name | Date |
|---|---|---|
| 2,330,098 | Watts | Sept. 21, 1943 |
| 2,330,685 | Connolly | Sept. 28, 1943 |
| 2,358,879 | Redcay | Sept. 26, 1944 |
| 2,398,899 | Teter | Apr. 23, 1946 |